(12) United States Patent
Veloskey (10) Patent No.: US 9,455,559 B1
(45) Date of Patent: Sep. 27, 2016

(54) PLUGGING DEVICE (71) Applicant: Hunter Industries, Inc., San Marcos, CA (US)

(72) Inventor: Thomas E. Veloskey, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 241 days.

(21) Appl. No.: 14/264,511

(22) Filed: Apr. 29, 2014

(51) Int. Cl.
*H02G 3/08* (2006.01)

(52) U.S. Cl.
CPC .................................... *H02G 3/088* (2013.01)

(58) Field of Classification Search
USPC ..................... 174/135, 50; 411/516; 439/210
See application file for complete search history.

(56) References Cited

U.S. PATENT DOCUMENTS

| | | | | |
|---|---|---|---|---|
| 2,865,662 | A * | 12/1958 | Nurmse | A01K 89/0111 242/318 |
| 6,346,675 | B1 * | 2/2002 | Igel | F16B 21/088 16/2.1 |
| 6,940,012 | B2 * | 9/2005 | Case | H02G 3/088 174/50 |
| 2009/0208311 | A1 * | 8/2009 | Churchill | F16B 37/043 411/516 |

* cited by examiner

*Primary Examiner* — William H Mayo, III
*Assistant Examiner* — Krystal Robinson
(74) *Attorney, Agent, or Firm* — Knobbe, Martens, Olson & Bear, LLP (57) ABSTRACT

A plugging device can include a plug member configured to connect to, plug, or block an aperture in a wall. The plugging device can include a lock member configured to secure the plugging device in the aperture. The lock member can be connected to the plug member. A release member can be connected to the lock member. The plug member, lock member, and/or release member can form a monolithic part. In some cases, the plugging device is a compliant mechanism.

20 Claims, 10 Drawing Sheets

PLUGGING DEVICE

BACKGROUND

1. Technical Field

The present disclosure relates to plugging devices. More specifically, the present disclosure relates to devices for connecting to, plugging, and/or obstructing apertures in walls, such as walls of electrical boxes, irrigation controller boxes, or other types of boxes.

2. Description of the Related Art

Electrical boxes or irrigation controller boxes can house electrical and mechanical components. In some applications, the boxes include one or more apertures to facilitate wired or other connection between the boxes and other system components. Plugs are commonly attached to one or more of the apertures.

SUMMARY

A releasably lockable plugging device can include a plug member. In some cases, the releasably lockable plugging device includes a lock. The lock can include a first locking member and a second locking member. In some embodiments, the second locking member includes a first surface facing generally away from the plug member. The first surface can have a convex shape when the second locking member is in a released configuration. In some cases, the first surface has a concave shape when the second locking member is in a locked configuration. In some embodiments, the second locking member includes a second surface opposite the first surface. The first locking member can be connected to the plug member and to the second locking member. The first locking member can include a first side facing generally toward the plug member. In some cases, at least a portion of the first side of the first locking member comprises an abutment portion. The abutment portion can limit the extent to which a portion of the first locking member is moveable toward the plug member when the plugging devices is inserted through an aperture in a wall. In some cases, the first locking member includes a second side facing generally toward the second surface of the second locking member. The second side of the first locking member can have a concave shape when the second locking member is in the locked configuration and when the second locking member is in the released configuration. In some embodiments, the second locking member tends to move away from the locked configuration when the second locking member is in the released configuration. In some cases, the second locking member tends to move away from the released configuration when the second locking member is in the locked configuration.

In some cases, the releasably lockable plugging device includes a user engagement member connected to the lock member. In some embodiments, the user engagement member is connected to the second locking member. In some cases, the plugging device is a compliant mechanism. In some embodiments, the first locking member is connected to the second locking member via a hinge. The hinge can be a flexible portion of material. In some cases, a width of the lock member reduces when the second locking member is moved away from the plug member.

A bi-stable plugging device can include a lock member. The lock member can be configured to transition between a locked configuration and a released configuration. In some cases, the lock member includes a first locking portion having a first inner surface. In some embodiments, the first locking portion has an outer surface. In some embodiments, the first locking portion has a first outer portion. The lock member can include an abutment member. In some cases, the abutment member extends from the outer surface of the first locking portion. The lock member can include a second locking portion. The second locking portion can have a second inner surface and a second outer portion. In some cases, the second locking portion is connected to the first locking portion. In some embodiments, the plugging device includes a plug member. The plug member can be connected to the first locking portion. In some cases, the plug member has a contact surface configured to contact a wall when the plugging device is engaged with an aperture of the wall. In some embodiments the abutment member limits movement of the first outer portion of the first locking portion toward the plug member to maintain the first inner surface in a concave shape when the lock member is in both the locked configuration and in the released configuration.

In some embodiments, the contact surface of the plug member includes an indentation, the indentation configured to accommodate a sealing member. In some cases, the sealing member is an elastomeric O-ring. In some cases, one or more protrusions extend from the contact surface. In some embodiments, the plug member includes an insertion portion extending from the contact surface, the insertion portion sized and shaped to fit within an aperture of a wall. In some cases, the first locking portion is connected to the insertion portion of the plug member. The lock member can have a width that decreases when the second locking portion is moved away from the plug member. In some cases, the plugging device includes a release member connected to the second locking portion. In some embodiments, a concavity of the first inner surface increases when the second locking portion is moved away from the plug member. In some cases, the plugging device is a compliant mechanism.

A system can include the plugging device and an electrical box comprising a wall having an aperture, wherein the plugging device is configured to releasably couple with the aperture of the electrical box.

According to some variants, a bi-stable plugging device can include a seal member. The seal member can have an insertion portion. In some cases, the seal member include a backing portion. The insertion portion can be sized to fit within an aperture of a wall. The backing portion can have one or more flanges configured to abut a first surface of the wall. In some cases, the plugging device includes a release member. In some embodiments, the plugging device include a pair of hinged members. Each hinged member can be configured to transition between an engaged configuration and a released configuration. In some cases, each hinged member includes a first end connected to the seal member. Each hinged member may include a second end connected to the release member. In some cases, each hinged member includes a first hinge permitting bending of the hinged member in first direction. Each hinged member can include a second hinge between the first hinge and the first end of the hinged member. The second hinge can permit bending of the hinged member in a second direction opposite the first direction. In some cases, each hinged member includes a third hinge between the first hinge and the second end of the hinged member. The third hinge can permit bending of the hinged member in the first direction. In some cases, each hinged member include a protrusion extending toward the seal member when the hinged member is bent about the second hinge. The protrusion can be configured to engage a second surface of the wall when the hinged member is in the engaged configuration.

In some cases, one or more of the first hinge, the second hinge, and the third hinge is a flexible portion of material.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

Irrigation control boxes or other electrical boxes can contain various internal electrical and/or mechanical components. It can be desirable to connect one or more of the internal components to an external system or component. For example, it may be desirable or necessary to electrically connect the box, or some internal component thereof, to a power source. In some cases, connection between the internal components and an external component requires passage of wires or other structures through a wall of the box. One or more aperture (e.g., holes) can be formed in the wall of the box to facilitate passage of wire through the wall.

In some cases, fewer than all of the apertures in the wall of the box may be used for a given application or it may be desirable to reduce the size of the aperture. It can be desirable to close or reduce the size of apertures in the wall, such as to inhibit or prevent access to the interior of the box by unwanted persons, pests, weather, or other factors. It may be desirable to secure a plug into the aperture from an interior or exterior side of the wall. In some examples, a plug can be designed to inhibit or prevent unlocking and/or removal of the plug from an exterior of the box.

Figure 1:
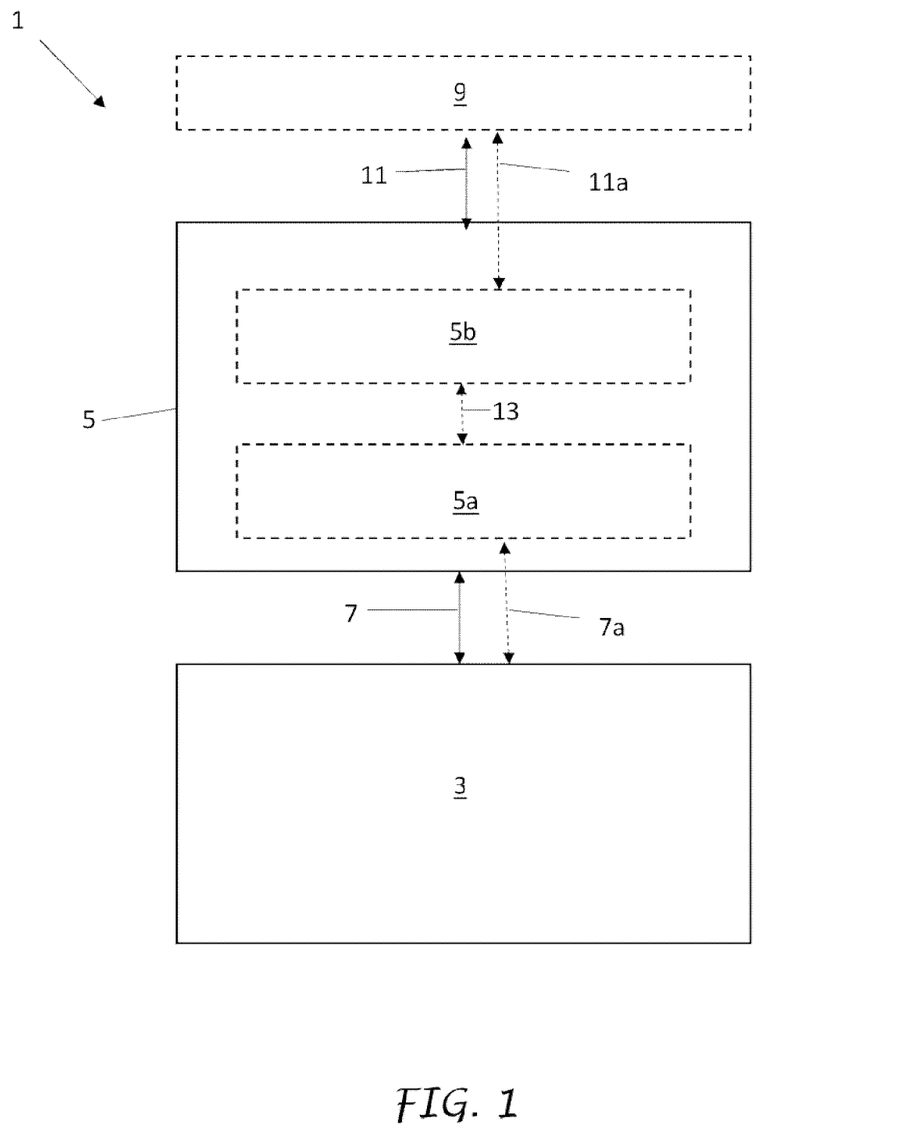
FIG. 1 is a schematic representation of a plugging device.

As illustrated in FIG. 1, a plugging device 1 can include a seal member or plug member 3. The plug member 3 can be sized, shaped, and/or configured to connect to, plug, and/or block an aperture, channel, or other gap in a wall. For example, the plug member 3 can be configured to fit into or cover at least a portion of an aperture in a wall when the plugging device 1 is installed in the aperture of the wall. In some embodiments, a portion of the plug member 3 is sized and shaped to fill the aperture into which the plugging device 1 is installed. In some embodiments, the plug member 3 is sized and shaped to cover the aperture into which the plugging device 1 is installed. In some applications, the plug member 3 can be shaped and sized such that the entire plug member 3 remains outside of the aperture into which the plugging device 1 is installed.

In some embodiments, the plugging device 1 includes a locking member 5. The locking member 5 can be connected to the plug member 3. As used herein, the term "connected," or any derivative thereof, is a broad term used in its ordinary sense and includes, unless otherwise noted, at least direct connection, indirect connection, connection via intermediate structure, engagement, attachment, and/or coupling. For example, the locking member 5 can be connected to the plug member 3 via a connecting structure 7 (e.g., a joint, hinge, fastener, or other connecting structure). In some embodiments, the locking member 5 is connected to the plug member 3 directly without intermediate structure. In some cases, the locking member 5 and plug member 3 form a single, monolithic part.

The locking member 5 can transition between a released configuration and a locked configuration. The locking member 5 can retain the plug member 3 in a plugging position when the locking member 5 is in the locked configuration. The locking member 5 can release the plug member 3 from the plugging position when the locking member 5 is transitioned to the released configuration.

Optionally, the plugging device 1 can include a release member 9. The release member 9 can be connected to the locking member 5. For example, the release member 9 can be connected directly to the locking member 5 and/or connected via a connecting structure 11. In some embodiments, the release member 9 is formed as a monolithic part with all or a portion of the locking member 5. The release member 9 can provide a tactile interface between a user of the plugging device 1 and the locking member 5. For example, the release member 9 can be a protrusion, surface roughening, knob, handle, lever, indentation, and/or other structural feature the user can grab or otherwise engage to transition the locking member 5 between the locked configuration and the released configuration. In some embodiments, a portion of the locking member 5 provides a tactile interface between the user of the plugging device 1 and the locking member 5. For example, a portion of the locking member 5 may perform the function of a release member and a separate release member 9 may not be included.

In some embodiments, the locking member 5 includes a first locking portion 5a and a second locking portion 5b. The first and second locking portions 5a, 5b can interact with each other to transition the locking member 5 between the locked configuration and the released configuration.

The first locking portion 5a can be connected to the plug member 3. In some embodiments, the first locking portion 5a is connected directly to the plug member 3 and/or connected via a connecting structure 7a. In some embodiments, the first locking portion 5a and the plug member 3 form a monolithic part. The first locking portion 5a and/or second locking portion 5b can include one or more braces or abutment structures. The braces and/or abutment structures can be configured to engage with a portion of the structure having the aperture into which the plugging device 1 is installed.

The second locking portion 5b can be connected to the first locking portion 5a. In some embodiments, the second locking portion 5b is connected to the first locking portion 5a directly and/or via a connecting structure 13. In some cases, the first and second locking portions 5a, 5b form a single monolithic part.

In some embodiments, a portion of the second locking portion 5b forms a release structure (e.g., a handle, knob, indentation, protrusion, or other tactile feature). As illustrated, the second locking portion 5b can be connected to the release member 9 directly and/or via a connecting structure 11a. In some cases, the second locking portion 5b and release member 9 form a monolithic part.

FIGS. 2-8 illustrate an embodiment of a plugging device 100. The plugging device 100 can include one or more of the components described above with respect to the plugging device 1. In some cases, components of the plugging device 100 can function in the same or a similar manner as those components of the plugging device 1 (e.g., the plug member 102, described below, may function in a same or similar manner to the plug member 3 described above).

Figure 2:
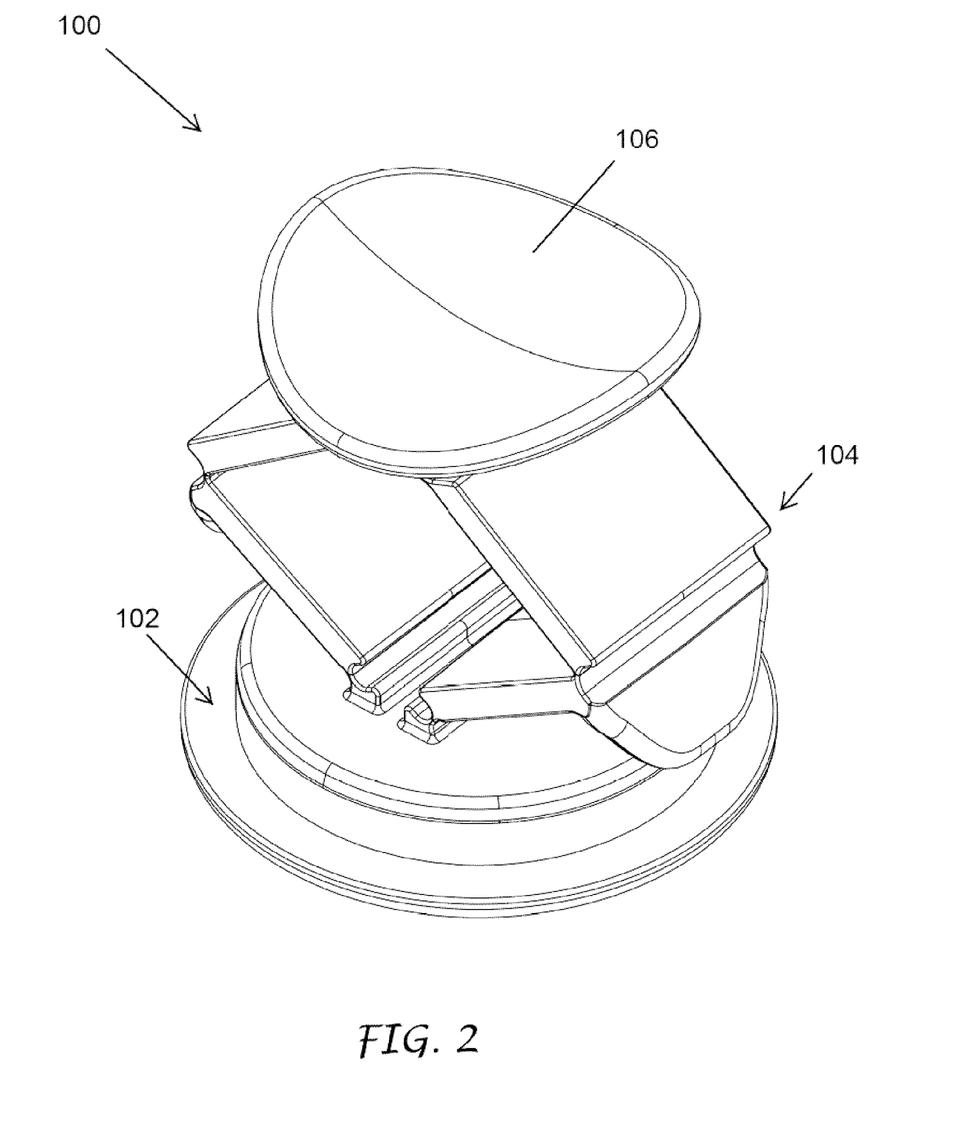
FIG. 2 is a perspective view of an embodiment of a plugging device.

As noted above, the plugging device 100 can include a plug member 102. As illustrated, the plug member 102 can be connected to a lock member 104. A release member 106 can be connected to the lock member 104. For example, the release member 106 can be connected at or near an end of the lock member 104 opposite the plug member 102. In some cases, the release member 106 may also be used to secure the lock member 104. In some embodiments, the plug member 102, lock member 104 and release member 106 form a single monolithic part (e.g., an extruded, injection-molded, co-molded or otherwise-formed single part). In some cases, the plug member 102 can be formed from a material different from that of the lock member 104 and/or release member 106.

Figure 3:
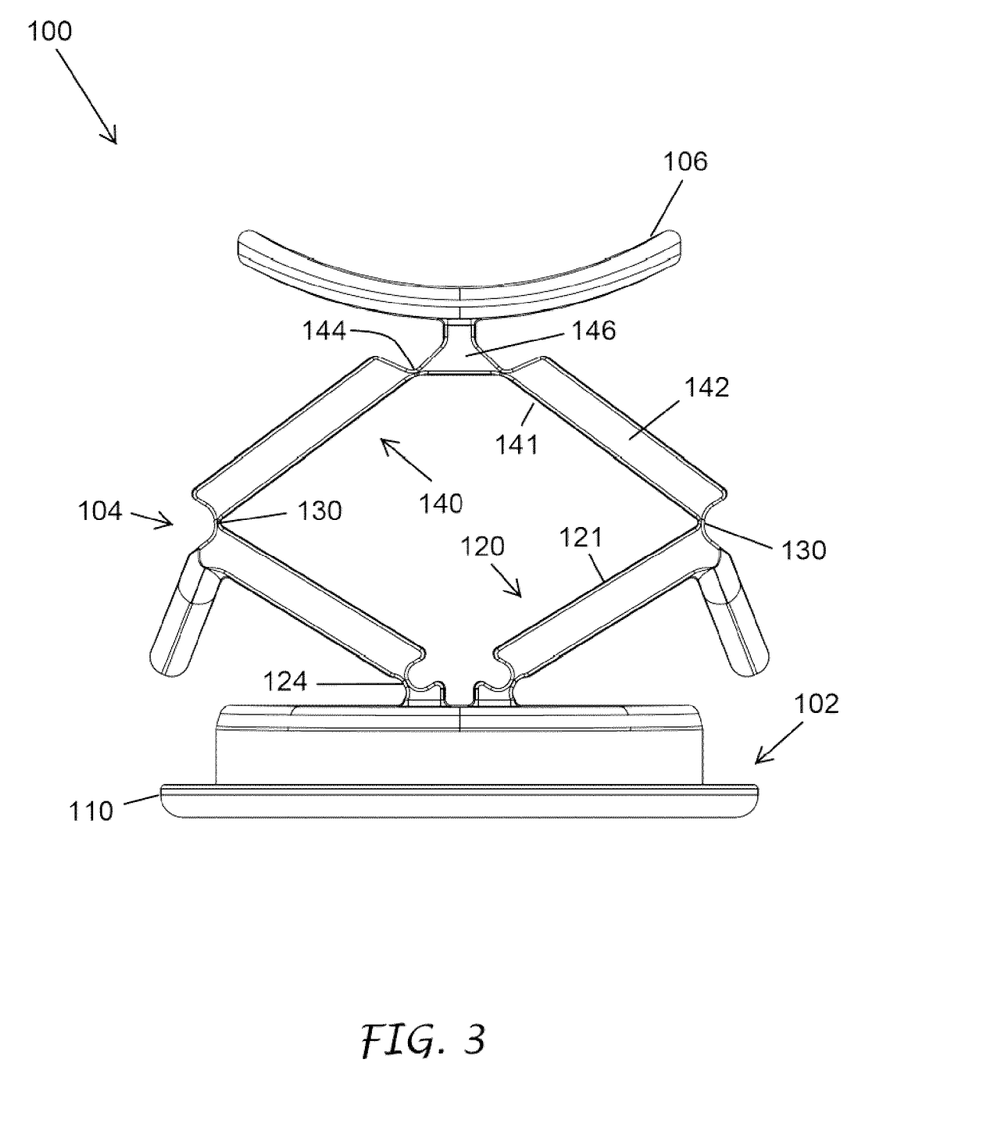
FIG. 3 is a front plan view of the plugging device of FIG. 2.
Figure 4:
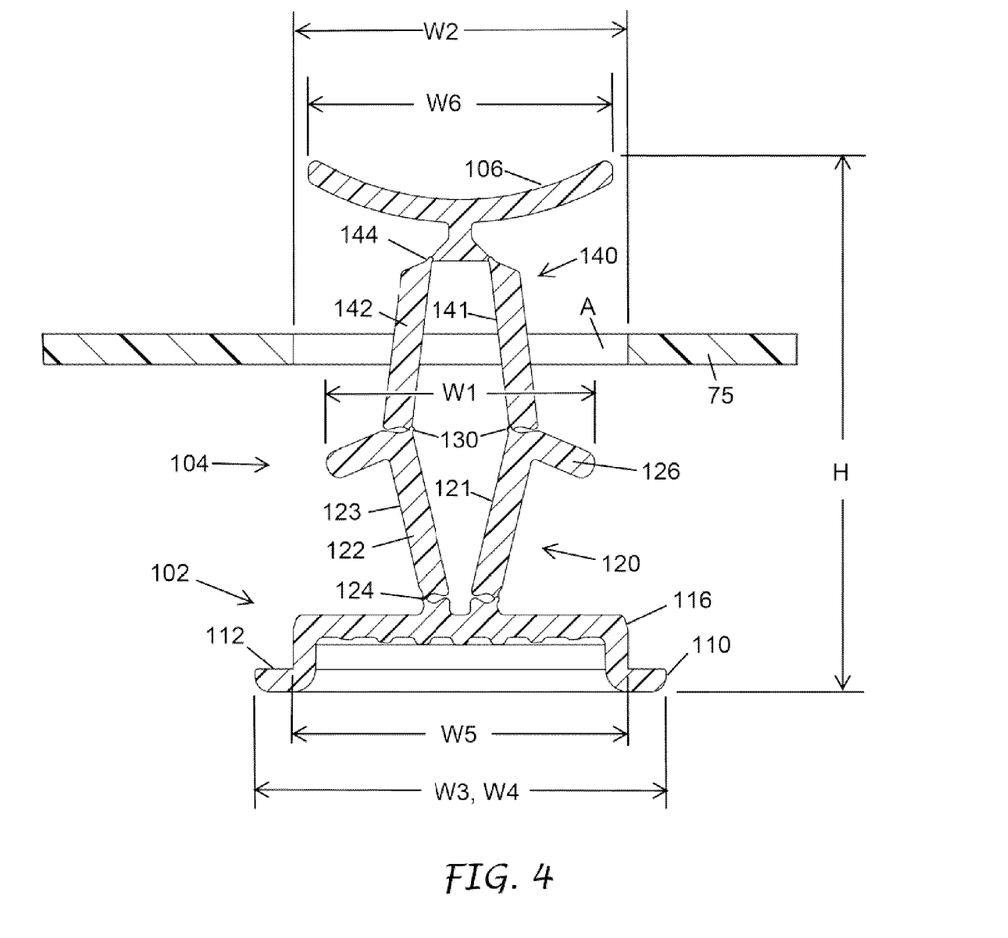
FIG. 4 is a front cross-section view of the plugging device of FIG. 2 partially inserted into an aperture of a wall.

As illustrated in FIGS. 3 and 4, the plug member 102 can include a stop portion 110. The stop portion 110 can have a width W4. As used herein, the term "width," or any derivative thereof, is a broad term used in its ordinary sense and includes, unless otherwise noted, at least diameters, major diameters, minor diameters, areas, spans, expanses, and/or other dimensional measurements. The width W4 can be greater than the width W2 of the aperture A into which the plugging device 100 is installed, as best seen in FIG. 4. The stop portion 110 can include a contact surface 112. The contact surface 112 can be generally planar. In some embodiments, the contact surface 112 includes one or more surface features such as protrusions, indentations, ridges, valleys, channels, apertures, waves, and/or other surface features. In some embodiments, the contact surface 112 faces the lock member 104.

In some embodiments, the plug member 102 includes an insertion portion 116. The insertion portion 116 can be connected to the stop portion 110 of the plug member 102. In some embodiments, the insertion portion 116 forms a monolithic part with the stop portion 110. In some applications, the plug member 102 does not include an insertion portion 116.

The insertion portion 116 can extend from the stop portion 110 toward the lock member 104. As illustrated, the insertion portion 116 can have a width W5. The width W5 of the insertion portion 116 can be less than the width W4 of the stop portion 110 of the plug member 102. As shown, the width W5 is less than a width W2 of the aperture A into which the plugging device 100 is designed to be installed, though the width W5 may also be greater than or equal to the width W2. In some embodiments, the insertion portion 116 is sized and shaped to fit at least partially within the aperture into which the plugging device 100 is installed. In some cases, the insertion portion 116 is sized and shaped fit snuggly within the aperture. In some cases, the insertion portion 116 is sized and shaped to snap fit within the aperture. The first locking portion 120 can be connected to the insertion portion 116, as illustrated, and/or to the stop portion 110 of the plug member 102. In some cases, the first locking portion 120 is configured to connect to an intermediate structure between the locking portion and the plug member 102.

As illustrated in FIGS. 3 and 4, the lock member 104 can include a first locking portion 120 and a second locking portion 140. The first locking portion 120 can be connected to plug member 102. The second locking portion 140 can be connected to the first locking portion 120 at one or more lock connection points 130. In some embodiments, the second locking portion 140 is hingedly connected to the first locking portion 120 at one or more lock connection points 130. For example, the lock connection points 130 can be mechanical hinges (e.g., pin and barrel hinges, ball and socket joints, flexible hinges, etc.). In some embodiments, the connection points 130 are thin and/or flexible portions of material that are configured to bend. For example, the first and second locking portions 120, 140 can be connected via thin portions of material at the connection points 130 formed from a single monolithic part.

Looking to FIG. 3, the first locking portion 120 and/or second locking portion 140 can have a generally bowed shape (e.g., a curved shape). As illustrated, the bowed shapes of each respective locking portion are accentuated by hinges 124 or 144, though it will be understood that one or more of the hinges are not required. Each of the first and second locking portions 120, 140 can have opposing surfaces facing each other. In some embodiments, the first locking portion 120 has a generally concave surface facing the second locking portion 140. In some such embodiments, a surface of the second locking portion 140 which faces the first locking portion 120 can have a concave shape when the lock member 104 is in a released position. In some cases, the first locking portion 120 has a generally convex surface facing the second locking portion 140. In some such embodiments, a surface of the second locking portion 140 which faces the first locking portion 120 can have a convex shape when the lock member 104 is in the released position. The concavity of the surface of the second locking portion 140 facing the first locking portion 120 can switch (e.g., from concave to convex or vice versa) when the lock member 140 transitions between the released configuration and the locked configuration. Alternatively, the concavity of the first locking portion 120 can transition between the released and locked configurations.

In some cases, the lock member 104 can be bi-stable. For example, the lock member 104 can have a first stable (e.g., at rest) position wherein the second locking portion 140 is spaced away from the first locking portion 120 and the concavity of the second locking portion 140 is opposite the concavity of the first locking portion 120. In some cases, the lock member 104 has a second stable position wherein the second locking portion 140 is closer to the first locking portion 120 as compared to the first stable position, and wherein the concavities of the first and second locking portions 120, 140 are the same (e.g., both convex or concave, and bowed in the same direction).

Figure 6:
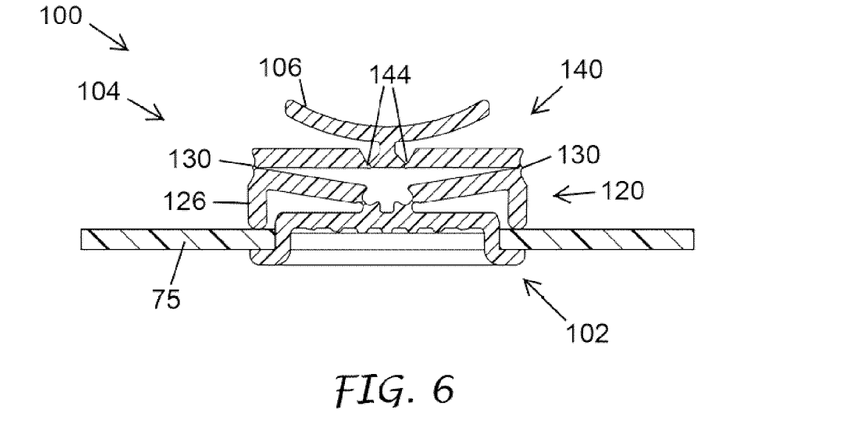
FIG. 6 is a front cross-section view of the plugging device of FIG. 2 in a second transition position.
Figure 7:
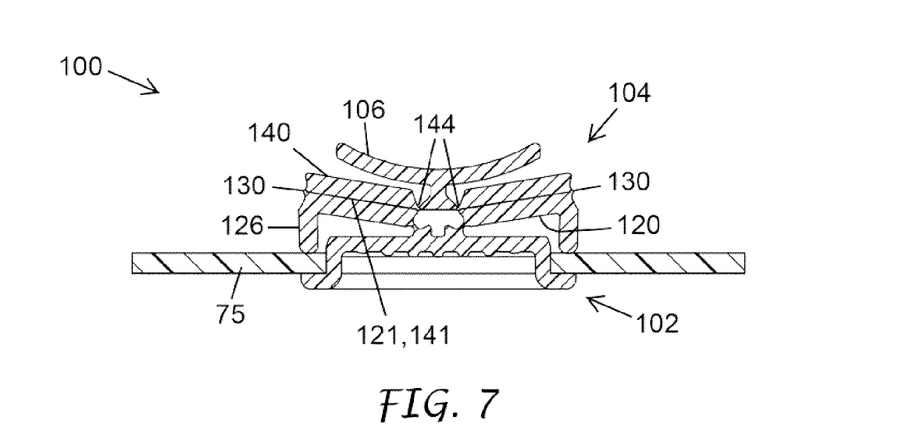
FIG. 7 is a front cross-section view of the plugging device of FIG. 2 in a locked configuration.

Movement of the second locking portion 140 toward the first locking portion 120 can transition the lock member 104 from the released configuration (see, e.g., FIG. 5) to the locked configuration (see, e.g., FIG. 7). Movement of the second locking portion 140 toward the first locking portion 120 can change the shape (e.g., the concavity) of the second locking portion 140. For example, the second locking portion 140 can pass through an inflection point (see, e.g., FIG. 6) between the released configuration and the locked configuration wherein the concavity of the second locking portion 140 changes from being opposite from the concavity of the first locking portion 120 to being the same as the concavity of the first locking portion 120.

Transitioning the shape of the second locking portion 140 from one concavity to another concavity can introduce strain to the material of the second locking portion 140. The strain can reach a maximum when the second locking portion 140 reaches its inflection point. Strain in the material of the second locking portion 140 can cause the second locking portion 140 to tend to move away from the inflection point toward either the released configuration or the locked configuration, depending on the side of the inflection point on which the second locking portion 140 is positioned. For example, the second locking portion 140 can tend to move away from the inflection point toward the released configuration when the second locking portion 140 is positioned between the first stable position and the inflection point. The first locking portion 120 and/or second locking portion 140 can include one or more hinges. The hinges of the first and/or second locking portions 120, 140 may increase the stability of the first and/or second locking portions 120, 140 when the second locking portion 140 is between the inflection point and the first and second stable positions.

Figure 5:
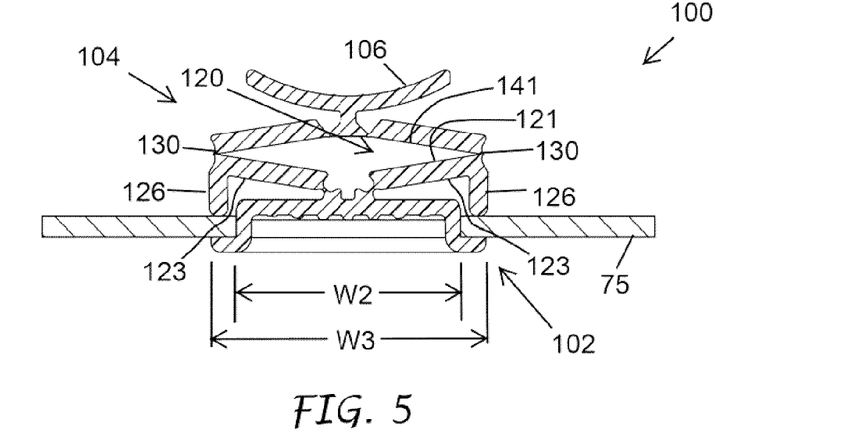
FIG. 5 is a front cross-section view of the plugging device of FIG. 2 in a first transition position.

As illustrated in FIG. 5, the first locking portion 120 can include a first inner surface 121 generally facing the second locking portion 140. The second locking portion 140 can include a second inner surface 141 generally facing the first inner surface 121 of the first locking portion 120.

The lock member 104 can transition between an unlocked configuration (see, e.g., FIGS. 2-6) and a locked configuration (see, e.g., FIG. 7). In some embodiments, the second inner surface 141 retains a concave shape when the lock member 104 is in the unlocked configuration. In some embodiments, the first inner surface 121 retains a concave shape when the lock member 104 is in the unlocked configuration.

FIG. 4 illustrates the plugging device 100 in an insertion configuration as the plugging device 100 is installed into an aperture A in a wall 75. As illustrated, the lock member 104 can have a width W1 that is less than the width W2 of the aperture A into which the plugging device 100 is installed when the plugging device 100 is in the insertion configuration.

In some embodiments, the plugging device 100 can be transitioned to the insertion configuration by pulling the release member 106 and/or some portion of the second locking portion 140 away from the plug member 102. Pulling the release member 106 away from the plug member 102 can increase the overall height H of the plugging device 100 and/or decrease the overall width W1 of the locking member 104. For example, pulling the release member 106 away from the plug member 102 can increase the concavity of the first and second inner surfaces 121, 141. In some embodiments, pulling the release member 106 away from the plug member 102 can draw the two or more connection points 130 toward each other.

Figure 4A:
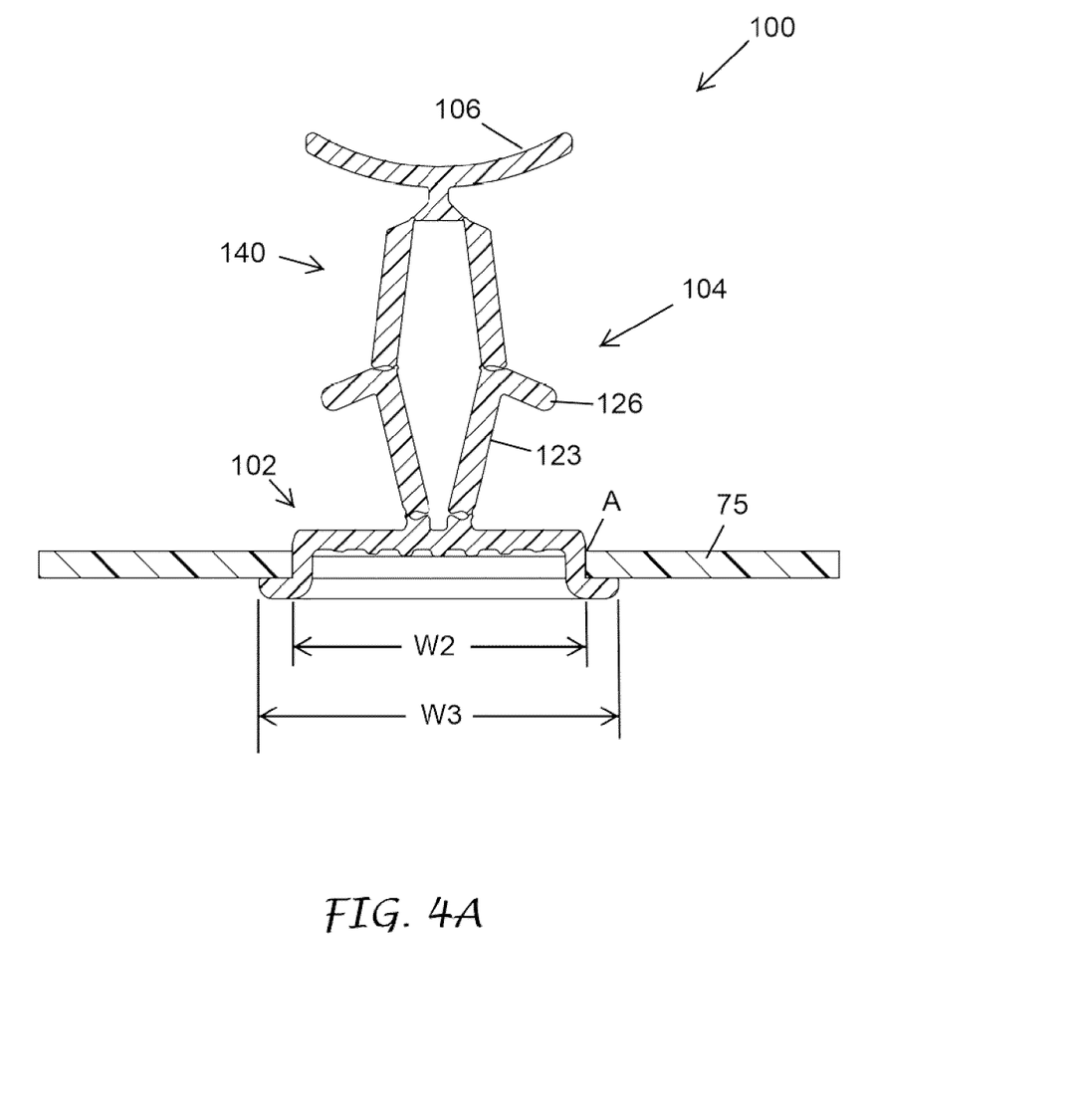
FIG. 4A is a front cross-section view of the plugging device of FIG. 2 fully inserted into the aperture of the wall.

FIG. 4A illustrates the plugging device 100 fully inserted into the aperture A of the wall 75. As illustrated, plug member 102 can inhibit or prevent complete passage of the plugging device 100 through the aperture A. For example, the plug member 102 can have a width W3 that is greater than a width W2 of the aperture. In some such embodiments, interference between the wall 75 and a portion of the plug member 102 can inhibit or prevent the plug member 102 from passing all the way through the aperture A.

Upon insertion of the plugging device 100 into the aperture A, the release member 106 and/or second locking portion 140 can be moved toward the plug member 102. Movement of the second locking portion 140 toward the plug member 102 can increase the width W1 of the locking member 104. In some embodiments, movement of the second locking portion 140 toward the plug member 102 can increase the width W1 to a width greater than the width W2 of the aperture A in which the plugging device 100 is inserted.

FIG. 5 illustrates the plugging device 100 in a first transition position between the locked and unlocked configurations. As illustrated, the plugging device 100 can include one or more abutment portions 126. The abutment portions 126 can be configured to abut the wall through which the plugging device 100 is inserted when the lock member 104 is transitioned from the released configuration to the locked configuration. For example, abutment between the abutment portion 126 and the wall 75 can increase stress/strain in the material of the lock member 104. Increasing stress/strain in the lock member 104 can increase security of the lock member 104 to the wall 75 when the lock member 104 is in the locked configuration. For example, increased stress/strain in the lock member 104 can increase the compressive force on the wall 75 between the abutment portion 126 and the stop portion 110 of the plug member 102. In some applications, a portion of the lock member 104 is configured to increase the stress/strain in the material of the lock member 104 when the lock member 104 is in the locked configuration.

The one or more abutment portions 126 can be a surface of the lock member 104, but may also extend outward from the lock member 104. As shown, two abutment portions 126 can extend from an outer surface 123 of the first locking portion 120. The one or more abutment portion 126 can be, for example, protrusions, ridges, mounds, and/or other surface features extending from the outer surface 123 of the first locking portion 120. In some embodiments, the one or more abutment portions 126 limit the distance the one or more connection points 130 can move toward the plug member 102. For example, the abutment portions 126 can come into contact with the wall 75 into which the plugging device 100 is installed as the one or more connection points 130 are moved toward the plug member 102. Contact between the abutment portions 126 and the wall 75 can inhibit or prevent the connections points 130 from moving closer to the wall 75 and/or to the plug member 102. As illustrated, contact between the abutment portions 126 and the wall 75 can inhibit or prevent further increase of the distance between the connection points 130. In some embodiments, contact between the abutment portions 126 and the wall 75 can maintain the first inner surface 121 in a concave shape. In some cases, one or more intermediate structures (not shown) can be positioned between the abutment portions 126 and the wall 75 when the plugging device 100 is in the locked configuration. For example, one or more washers, flanges, or other structures can be positioned between the abutment portions 126 and the wall 75. In some cases, the abutment portions 126 pass through apertures in other structures within, in addition to the aperture A of the wall 75. In some such embodiments, transition of the plugging device 100 to the locked configuration can compress one or more structures between the abutment portions 126 and the wall 75. FIG. 6 illustrates the plugging device 100 in a second transition position. The second transition position can correlate to an inflection point for the second inner surface 141. For example, movement of the release member 106 and/or second locking portion 140 past the second transition position toward the plug member 102 can transition the second inner surface 141 from a concave configuration to a convex configuration.

In some embodiments, further movement of the release member 106 and/or second locking portion 140 toward the plug member 102 after the abutment portions 126 contact the wall 75 can introduce strain to the material of the lock member 104. For example, movement of a central portion of the second locking portion 140 toward the plug member 102 can produce an outward (e.g., away from a central portion of the lock member 104 toward the connection points 130) force on the connection points 130. Contact between the abutment potions 126 and the wall 75 can inhibit or prevent movement of the connection points 130 away from the central portion of the second locking portion 140. The outward force applied to the connection points 130 can introduce strain to the connection points 130. The connection points 130 can be configured to store strain (e.g., tensile strain) energy when the plugging device 100 is in the second transition position.

In some embodiments, compressive force can be introduced to the second locking portion 140 when the second locking portion 140 (e.g., a central portion of the second locking portion 140) is moved toward the plug member 102 after the abutment portions 126 contact the wall 75. As explained above, contact between the abutment portions 126 and the wall 75 can inhibit or prevent movement of the connection points 130 away from the central portion of the second locking portion 140. Movement of the central portion of the second locking portion 140 toward the plug member 102 can reduce the concavity of the second inner surface 141. In some cases, reduction of the concavity of the second inner surface 141 can create compressing force (e.g., in a direction generally aligned between the connection points 130 and the central portion of the second locking portion 140) in the second locking portion 140 when the distance between the connection points 130 is held relatively constant.

Compressive force on the second locking portion 140 can create strain in the material of the second locking portion 140. In some embodiments the second locking portion 140 includes one or more flexible portions 144. For example, the second locking portion 140 can include one or more thin and/or flexible portions of material which define the flexible portions 144. The strain in the second locking portion 140 can be concentrated in the flexible portions 144. The flexible portions 144 can store the compressive strain introduced to the second locking portion 140 as strain energy.

In some embodiments, the second transition position of the plugging device 100 is defined as the position in which the strain energy in the lock member 104 (e.g., in the flexible portions 144 and the connection points 130) is at a maximum. The strain energy in the flexible portions 144 and/or in the connection points 130 can cause second locking portion 140 to tend away from the second transition position. In some embodiments, the force on the second locking portion 140 is bi-directional when the plugging device 100 is in the second transition position. For example, movement of the release member 106 and/or central portion of the second locking portion 140 from the second transition position toward the plug member 102 can urge the second locking portion 140 to the locked position (e.g., as illustrated in FIG. 7. Movement of the release member 106 and/or central portion of the second locking portion 140 from the second transition position away from the plug member 102 can urge the second locking portion 140 to the first transition position (e.g., as illustrated in FIG. 5). In some embodiments, strain energy within the locking member 104 can inhibit or prevent the second locking portion 140 from remaining at rest in a position between the second transition position and the locked position and between the second transition position and the first transition position, absent externally-applied force.

The first locking portion 120 can include two or more first outer portions 122. The first outer portions 122 can be connected to the plug member 102 (e.g., to the insertion portion 116 and/or to the stop portion 110). In some embodiments, the first locking portion 120 includes a center portion at an interface between two or more of the outer portions 122. In some embodiments, the center portion of the first locking portion 120 is connected to the plug member 102.

The second locking portion 140 can include two or more second outer portions 142. The second outer portions 142 can be connected to the release member 106. In some embodiments, the second locking portion 140 includes a center portion 146 (see, e.g., FIG. 3) at an interface between the two or more second outer portions 142. The center portion 146 of the second locking portion 140 can be connected to the release member 106. In some embodiments, the center portion 146 of the second locking portion 140 can include one or more tactile features to facilitate gripping of the center portion 146.

Figure 8:
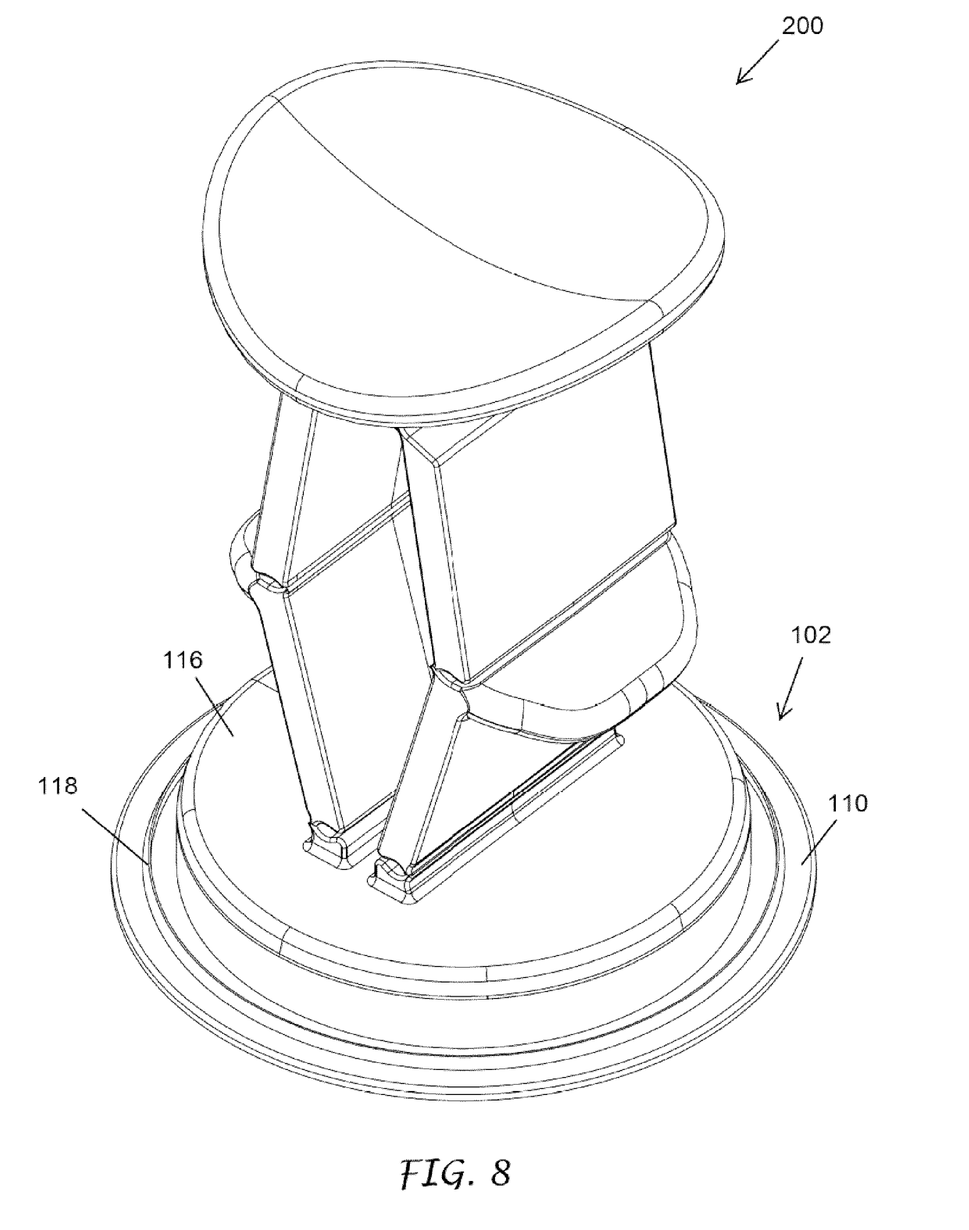
FIG. 8 is a perspective view of another embodiment of a plugging device having a ridge on a stop portion of the plug member.
Figure 8A:
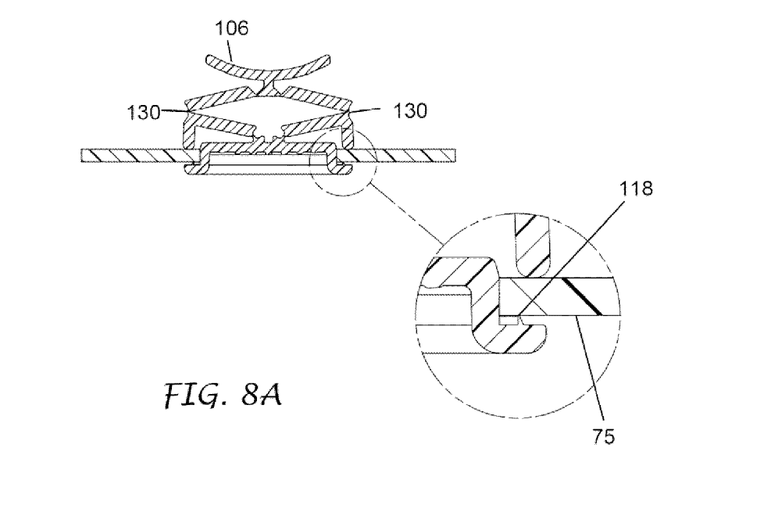
FIG. 8A is a front cross-section view of the plugging device of FIG. 8 a first transition position.
Figure 8B:
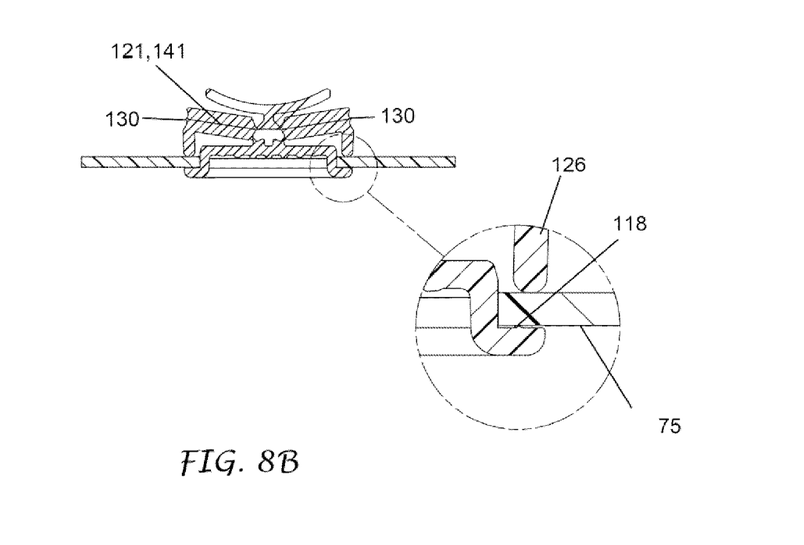
FIG. 8b is a front cross-section view of the plugging device of FIG. 8 in a locked configuration.
Figure 9:
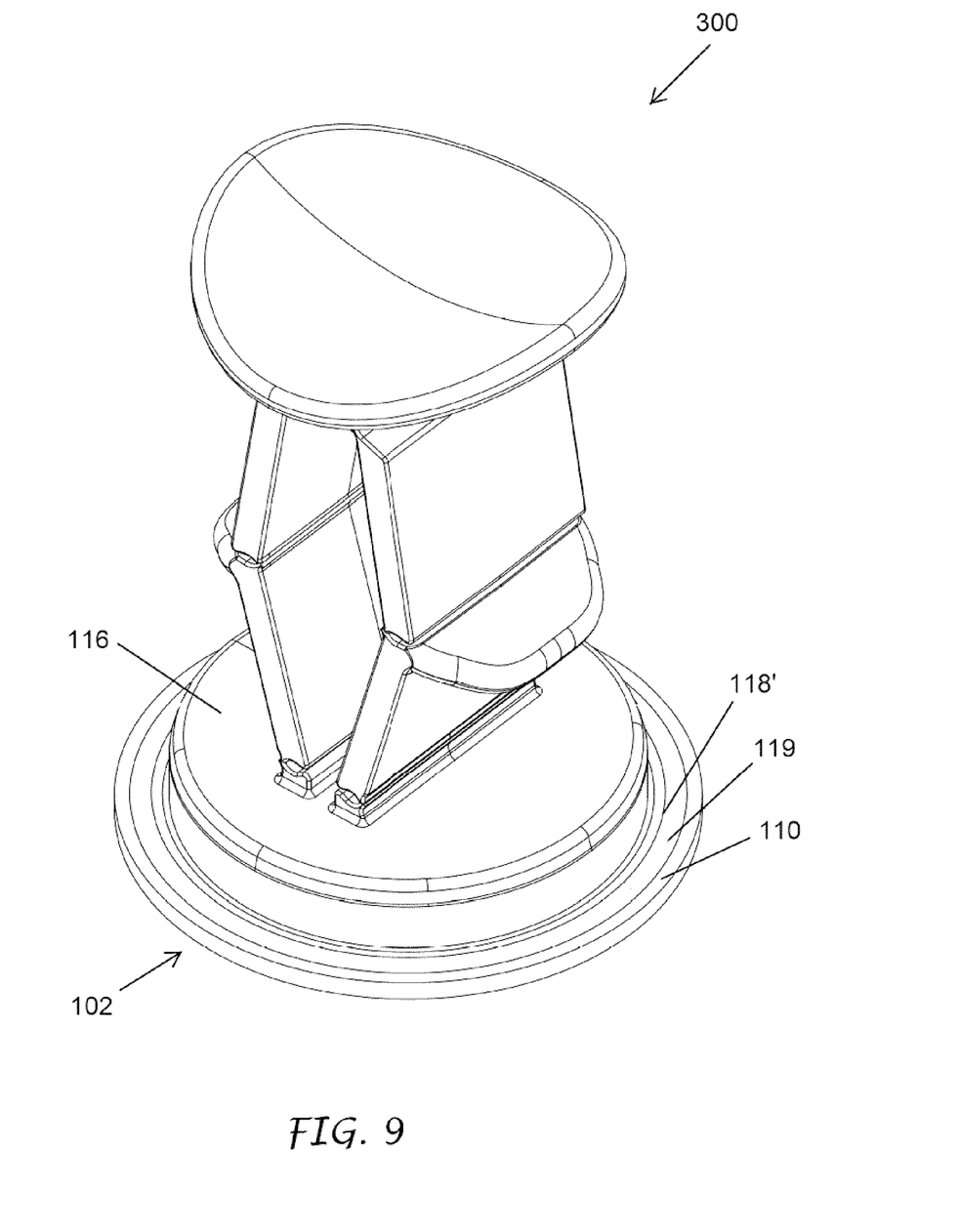
FIG. 9 is a perspective view of another embodiment of a plugging device having an indentation in a stop portion of the plug member.
Figure 9A:
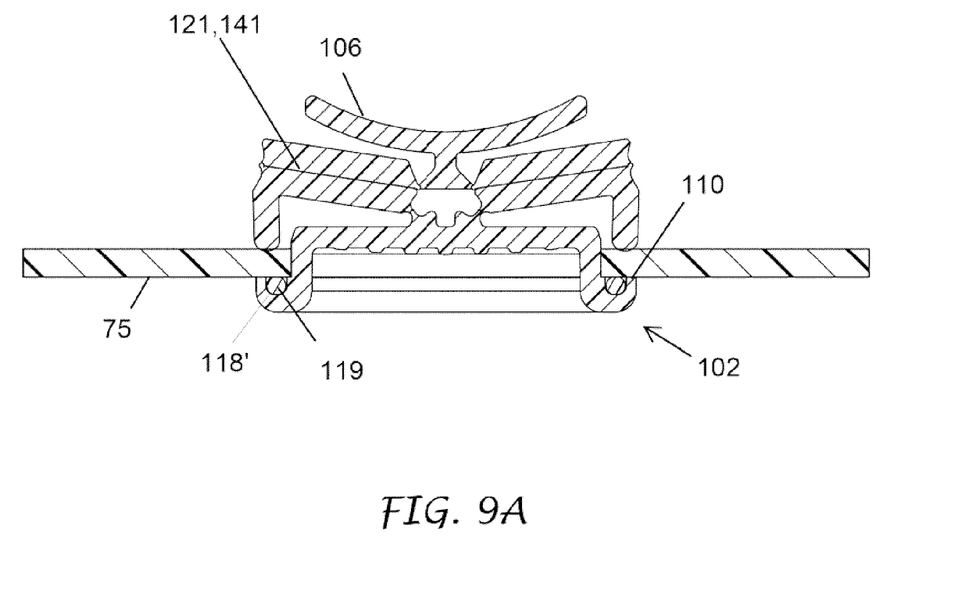
FIG. 9A is a front cross-section view of the plugging device of FIG. 9 in a locked configuration.

As illustrated in FIGS. 8 and 9, the stop portion 110 of the plug member 102 can include a ridge 118 and/or an indentation 118'. The ridge 118 and/or indentation 118' can be annular. In some embodiments, the ridge 118 and/or indentation 118' can accommodate a sealing feature such as an O-ring 119. In some embodiments, the ridge 118, indentation 118', and/or sealing feature can facilitate a sealing engagement between the stop portion 110 of the plug member 102 and a surface of the wall into which the plugging device 100 is installed. As illustrated in FIG. 8B, the ridge 118 may deform with pressure against a surface. Deformation of the ridge 118 can, in some cases, provide a seal. Sealing engagement between the stop portion 110 and the wall can inhibit or prevent fluid passage between the stop portion 110 and the wall.

In some embodiments, the plugging device 100 is a compliant mechanism. In some embodiments, the plugging device 100 (e.g., the plug member 102) includes one or more apertures, holes, cutouts, slots, or other features configured to permit passage of fluid and/or solid components (e.g., wires) through the plugging device 100 when the plugging device 100 is installed in an aperture of a wall. The plugging device 100 can, in some cases, be a monolithic part.

While an embodiment of a plugging device has been disclosed with a lock configured to transition between a released position and a locked position, it will be understood by those skilled in the art that the disclosed plugging devices can be modified in both arrangement and detail. For example, sealing member 119 (e.g., O-rings) can be included around an outer peripheral surface of the insertion portion 116 of the plug member 102. In some cases, one or more springs or other mechanical structures may be used to bias the lock member 104 toward and/or away from the locked configuration. In some cases, the plug member 102 can have a non-circular (e.g., oval, rectangular, or other polygonal) shape when viewed from a top perspective. For example, the plug member 102 may be sized and shaped to fit the size and shape of the aperture into which the plugging device is to be installed. In some cases, the contact surface 112 may be a curved or arched surface. As described above, the plugging device may be a monolithic and/or compliant mechanism. In some cases, the plugging device is constructed from two or more separate components. For example, the first locking portion 120 and second locking portion 140 can be separate components connected to each other via mechanical hinges.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A releasably lockable plugging device comprising:
   a plug member;
   a lock comprising a first locking portion and a second locking portion:
      the second locking portion comprising:
         a first surface facing generally away from the plug member, the first surface having a convex shape when the second locking portion is in a released configuration and a concave shape when the second locking portion is in a locked configuration; and
         a second surface opposite the first surface; and
      the first locking portion connected to the plug member and to the second locking portion, the first locking portion comprising:
         a first side facing generally toward the plug member, at least a portion of the first side comprising an abutment portion, the abutment portion limiting the extent to which a portion of the first locking portion is moveable toward the plug member when the plugging devices is inserted through an aperture in a wall; and
         a second side facing generally toward the second surface of the second locking portion, the second side having a concave shape when the second locking portion is in the locked configuration and when the second locking portion is in the released configuration;
   wherein the second locking portion tends to move away from the locked configuration when the second locking portion is in the released configuration and wherein the second locking portion tends to move away from the released configuration when the second locking portion is in the locked configuration.

2. The plugging device of claim 1, further comprising a user engagement member connected to the lock.

3. The plugging device of claim 2, wherein the user engagement member is connected to the second locking portion.

4. The plugging device of claim 1, wherein the plugging device is a compliant mechanism.

5. The plugging device of claim 1, wherein the first locking portion is connected to the second locking portion via a hinge.

6. The plugging device of claim 5, wherein the hinge is a flexible portion of material.

7. The plugging device of claim 1, wherein a width of the lock reduces when the second locking portion is moved away from the plug member.

8. A bi-stable plugging device comprising:
   a lock member configured to transition between a locked configuration and a released configuration, the lock member comprising:
      a first locking portion having a first inner surface, an outer surface, and a first outer portion;
      an abutment member extending from the outer surface of the first locking portion; and
      a second locking portion having a second inner surface and a second outer portion, the second locking portion connected to the first locking portion; and
   a plug member connected to the first locking portion and having a contact surface configured to contact a wall when the plugging device is engaged with an aperture of the wall;
   wherein the abutment member limits movement of the first outer portion of the first locking portion toward the plug member to maintain the first inner surface in a concave shape when the lock member is in both the locked configuration and in the released configuration.

9. The plugging device of claim 8, wherein the contact surface of the plug member includes an indentation, the indentation configured to accommodate a sealing member.

10. The plugging device of claim 9, wherein the sealing member is an elastomeric O-ring.

11. The plugging device of claim 8, wherein one or more protrusions extend from the contact surface.

12. The plugging device of claim 8, wherein the plug member includes an insertion portion extending from the contact surface, the insertion portion sized and shaped to fit within an aperture of a wall.

13. The plugging device of claim 12, wherein the first locking portion is connected to the insertion portion of the plug member.

14. The plugging device of claim 8, wherein the lock member has a width that decreases when the second locking portion is moved away from the plug member.

15. The plugging device of claim 8, further comprising a release member connected to the second locking portion.

16. The plugging device of claim 8, wherein a concavity of the first inner surface increases when the second locking portion is moved away from the plug member.

17. The plugging device of claim 8, wherein the plugging device is a compliant mechanism.

18. A system comprising the plugging device of claim 8 and an electrical box comprising a wall having an aperture, wherein the plugging device is configured to releasably couple with the aperture of the electrical box.

19. A bi-stable plugging device comprising:
- a seal member having an insertion portion and a backing portion, the insertion portion sized to fit within an aperture of a wall, the backing portion having one or more flanges configured to abut a first surface of the wall;
- a release member; and
- a pair of hinged members, each hinged member configured to transition between an engaged configuration and a released configuration, each hinged member comprising:
  - a first end connected to the seal member;
  - a second end connected to the release member;
  - a first hinge permitting bending of the hinged member in first direction;
  - a second hinge between the first hinge and the first end of the hinged member, the second hinge permitting bending of the hinged member in a second direction opposite the first direction;
  - a third hinge between the first hinge and the second end of the hinged member, the third hinge permitting bending of the hinged member in the first direction; and
  - a protrusion extending toward the seal member when the hinged member is bent about the second hinge, the protrusion configured to engage a second surface of the wall when the hinged member is in the engaged configuration.

20. The plugging device of claim 19, wherein one or more of the first hinge, the second hinge, and the third hinge is a flexible portion of material.

\* \* \* \* \*